Patented June 12, 1945

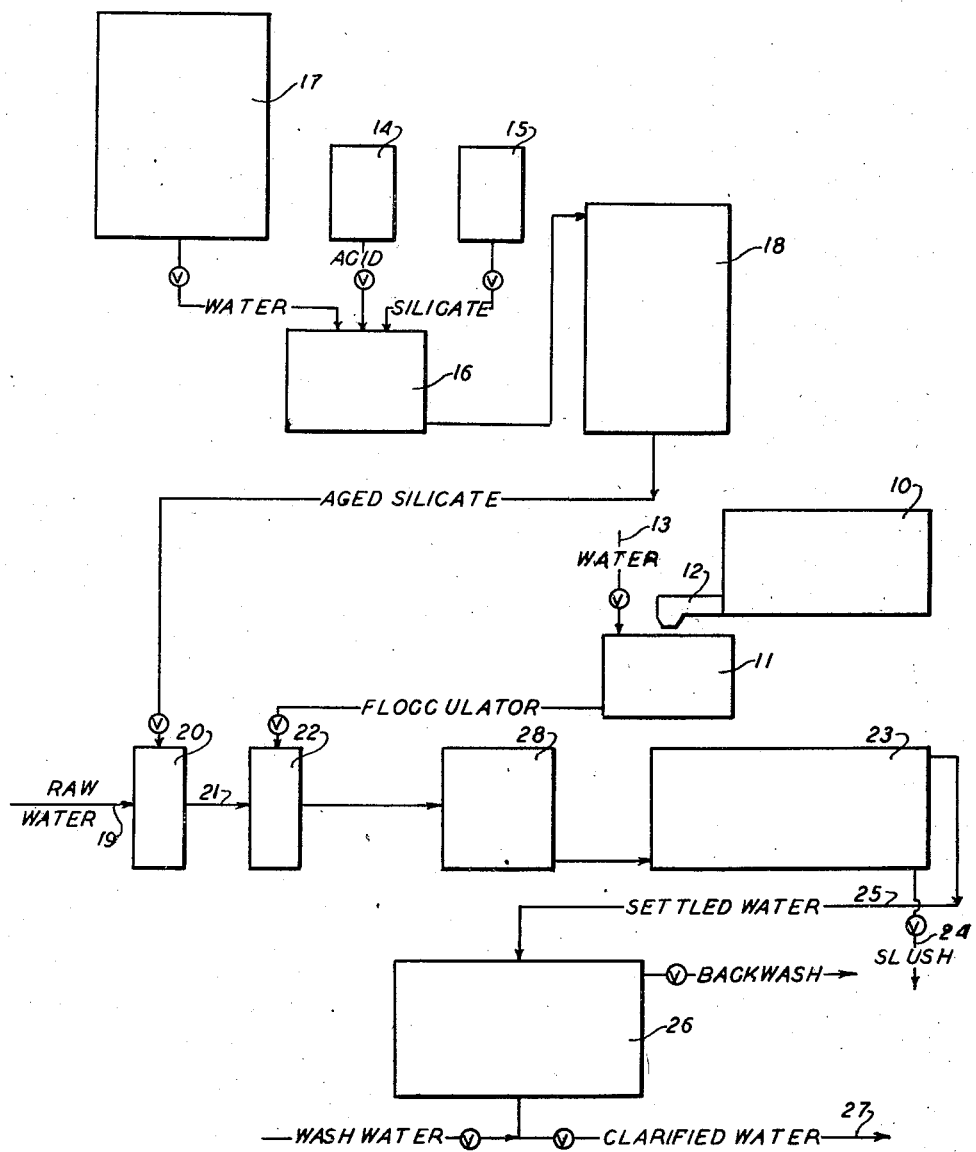

2,378,323

UNITED STATES PATENT OFFICE 2,378,323

METHOD OF PURIFYING OIL FIELD WASTE WATERS

Richard D. Pomeroy, Altadena, Calif., assignor to Santa Fe Springs Waste Water Disposal Company, a corporation of California Application January 20, 1944, Serial No. 519,058

4 Claims. (Cl. 252—330)

Waste waters separated from crude petroleum in oil fields and tank farms, and waters accumulated in the course of various petroleum refining processes, often or usually contain a small but material proportion of petroleum and various solid substances in suspension. As these waters are produced in large quantity and are ordinarily unfit for any use, they must be run to waste. But as the suspended petroleum is thought to be detrimental to marine or fresh water life or because it may form unsightly deposits along streams, it is often desirable to remove the greatest possible proportion of the suspended oil before the water is wasted into a stream or ocean. It is also desirable to reduce the quantity of suspended matter other than petroleum, though this requirement is usually less urgent.

The necessity for substantially complete removal of petroleum from these waste waters has in the past been very burdensome, because of the nature of the other impurities with which it is associated. The coarser oil particles, or such of them as consist of free oil, are more or less readily separated by settling and skimming. In most cases, however, the finer particles are in the form of a stubborn oil-in-water emulsion, or are adsorbed on the surfaces of clay or algae particles. These particles separate with extreme deliberation, some eventually coming to the surface of the charge in a settling tank while others ultimately find their way to the bottom. Oil-field waters are usually salt brines, containing from 300 to 800 grains chlorine per gallon, mainly in the form of sodium and magnesium chlorides. These salts stabilize emulsions and raise the specific gravity of the water to such extent that oil adsorbed on clay particles tends to remain in suspension. Thus the tendency is to the production of a three phase system, having loosely aggregated, slushy layers of petroleum emulsion on top and of adsorbed petroleum at the bottom, with considerable quantities of relatively stationary particles in the intervening layer.

Given sufficient time, this system will part to such degree that skimming and decantation will separate most of the suspensoids, but as this requires days or weeks it is utterly impracticable for the treatment of large daily volumes of water.

It is conventional to clarify turbid domestic or industrial waters by treatment with flocculating agents. In this treatment, iron or aluminum sulfate or other flocculating agent is added to the water and, in the presence of dissolved alkaline substances, a flocculent precipitate results. This precipitate entraps the fine suspensoids, which may thus be separated by a subsequent sedimentation or filtration of the flocs, the water being thus freed from any desired proportion of the suspended impurities.

The application of this method to the attempted clarification of oil-field waters containing suspended petroleum has not been successful. This is not surprising when we consider the widely different nature of the impurities present in this case as compared with those existing in the domestic and industrial waters to which the treatment has heretofore been applied.

If sedimentation is resorted to, the difficulties above described are repeated or even aggravated. In domestic and industrial waters the suspensoids are mainly mineral matter, specifically heavier than water; in oil-field waters the principal suspensoid, petroleum, is specifically lighter. The specific gravity of the oil-field water is also increased by its salt content. Thus, complete downward separation is usually impossible; there is the same tendency toward the formation of a three phase system, and clarification is too slow to be practicable.

The salts present in oil-field waters also interfere strongly with the conduct of the flocculation process if recourse is had to filtration in lieu of sedimentation. In this method of separation, relative specific gravities are immaterial, but it is of the first importance that the flocs be large, well defined and strong enough to maintain their integrity into the filter. As a rule some floc is formed, even in the treatment of these salty waters, but it develops very slowly, a serious drawback in the handling of large daily volumes. Further, the flocs are small initially and are so fragile that they tend to break down into small particles under the degree of agitation necessary to disperse the reagents and bring the suspension into the filter, thus making filtration slow and costly.

I have discovered that by the use of relatively slight modifications of the methods described by Baylis in U. S. Patent 2,217,466 and by Schworm and Graf in U. S. Patent 2,234,285, both of which refer to the treatment of nonsaline domestic and industrial waters, a wholly satisfactory result may be produced in the separation of petroleum from oil-field waters and the like.

As an illustration of the working of the method I shall describe its application to the treatment of the waste water from the Santa Fe Springs oil-field in Los Angeles County, California. This water, in quantity about 100,000 barrels per day, is produced along with crude petroleum from wells ranging from 3000 to 8500 feet in depth and producing mainly from formations of Repetto (Pliocene) age.

The greater part of the water is drawn from receiving tanks scattered over the field, into which the well fluids discharge and in which they roughly separate. The plant also receives highly mineralized water from zeolite water-softening plants and wastes from three refineries performing a wide range of operations from simple topping to catalytic cracking. The mixture is thus fully representative of petroliferous waste waters and has offered a serious problem in purification to the extent which permits it to be discharged into the ocean.

The water received by the plant passes first through a settling and skimming system which removes the greater part of the free oil and also acts to equalize the quality of the flow of water. As this skimming system is conventional it is not described. The raw effluent water from this system, as delivered into the subsequent purifying plant, has the following average analysis:

TABLE 1

*Analysis of raw water*

| | | |
|---|---|---|
| Petroleum __Parts per million__ | 30 to | 60 |
| Other suspensoids _____do____ | 50 to | 200 |
| Hydroxide _____do____ | | 00 |
| Carbonate _____do____ | | 00 |
| Bicarbonate _____do____ | 1000 to | 1300 |
| Chlorine _____do____ | 6000 to | 9000 |
| Calcium _____do____ | 100 to | 200 |
| Sulphate _____do____ | 30 to | 60 |
| Hydrogen sulfide (dissolved) _____do____ | 1 to | 5 |
| Total solids _____do____ | 13000 to | 15000 |
| Hydrogen ion concentration _____pH____ | 7.4 to | 9.0 |
| Turbidity (Jackson candle) _____ | 75 to | 200 |

This water enters a purifying plane which is illustrated in the form of a flow sheet in the attached drawing. Referring to this drawing, the first step described may be the preparation of the flocculating solution proper.

In this instance the fluocculating agent is aluminum sulfate, which is obtained as the crystalline dodecahydrate $(Al_2(SO_4)_3 \cdot 12H_2O)$ and stored in the powdered form in a bin 10 from which it is fed into a dissolving tank 11 by a proportioning feeder 12, water being supplied to the tank through a pipe 13. The feed of the salt is proportioned to the flow of raw water entering the system (through pipe 19) as will be described, and the strength of the solution flowing into the mixer tank 22 is immaterial. It is desirable, however, to maintain this solution in a moderate degree of dilution, so as to prevent pipe clogging. Ferric sulfate or ferric chloride may be substituted for aluminum sulfate on the basis of metallic equivalents.

The preparation of the sodium silicate solution adapted to this specific use is much more elaborate. Sulfuric acid, for example of 97% strength, is stored in a supply tank 14 and a commercial liquid sodium silicate in supply tank 15. This may be a silicate of any desired soda: silica ratio, but I prefer to use a silicate rich in silica, as for example one in which the ratio $Na_2O:SiO_2::1:3.5$. This starting solution may have a Baumé gravity of 41° and contain about 37% total solids, or 400 grams $SiO_2$ per litre.

This concentrated solution is drawn in relatively small quantity into a capacious mixing tank 16 in which it is diluted with about 24 volumes of water, bringing the solution to a concentration of about 1.6% silica. Into this diluted solution is drawn a quantity of sulfuric acid equal to about 2.4% of the original volume of silicate taken, or about 0.1% of the volume of the diluted solution. The contents of the tank are well mixed and the alkalinity determined, using methyl orange as an indicator. If this figure varies more than 100 parts in either direction from 750 parts ($Na_2O$) per million, the alkalinity should be adjusted to within that range by the cautious addition of acid or silicate as the case may be. At this point the hydrogen ion concentration should be about 8.5, but it is more accurate to titrate the alkalinity than to depend on the pH value.

The adjusted solution is then aged for a period just short of that at which gelation occurs. As the efficiency of the silicate in promoting floc formation increases rapidly with age but disappears when actual gelation occurs, and as the aging period is preferably made rather short in order to facilitate the operation, it is necessary to determine this critical point with considerable accuracy, which I do by the following procedure.

Two samples of the adjusted solution, of say 400 ml. each, are acidulated respectively with one drop and with two drops of concentrated sulfuric acid. The addition of the acid reduces the alkalinity and thus accelerates gelation, as will be described. When the more acid sample solidifies, a point which is readily observable, the less acid sample is closely watched and, when it also gelatinizes, the batch of solution is immediately diluted with an equal volume of water. This water should be available in a storage tank as at 17 so that the dilution may be completed rapidly. In the above test the time remaining after gelation of the second sample will be about equal to that elapsed between the gelation of the first sample and of the second.

The dilution short-stops the polymerization of the silicate, which may now be pumped into a storage tank 18, from which it is withdrawn as required for use. The solution remains in usable condition for at least several days, usually for a week or longer. If kept too long it separates out a portion of the silica and is reduced in efficiency. The aging period, which will be about one-half hour at the alkalinity above set forth, may be extended by reducing the acid dosage and thus increasing the residual alkalinity.

The procedure for the treatment of the contaminated water with the above described solutions is as follows. The raw water is introduced at a varying rate through feed pipe 19 into a flash mixer 20 which is also supplied with a stream of the aged and diluted silicate drawn from storage tank 18. These streams are automatically so proportioned that (in this instance) the silica ($SiO_2$) content of the water leaving the mixer through pipe 21 is of the order of 3 parts per million. The silica-containing water then enters a second flash mixer 22 in which it is blended with a stream of the above described solution of aluminum sulfate or other flocculating agent. This stream is automatically so proportioned to the water stream as to introduce about 15 parts per million of aluminum sulfate (as the dodecahydrate) or its equivalent in another agent.

Flocculation begins immediately in a tank 28 and is complete in about 20 minutes. The treated water may be passed directly to the filter if desired. The load on this unit may, however, be reduced by passing the stream into a relatively large settling tank 23 from which a slurry of aluminum hydroxide, oil and other suspensoids and water may be withdrawn occasionally as at 24 while relatively clear water passes off at 25 to the filters indicated at 26. From these elements, which may be sand beds or mechanical filters, purified water is discharged at 27 to the ocean or to a final step of removing substances productive of hydrogen sulfide, as described in my copending application Serial No. 514,154, filed December 13, 1943.

The flocs formed by this treatment are large and firm, settle rapidly and filter freely. As will be evident from the analysis below, of the treated water, they occlude substantially all of the originally suspended oil and the greater part of the other suspensoids. In the treatment of relatively small volumes of water the filters may even be dispensed with as the water settles bright in a short time. The slush settling in tank 23 and the back-wash from the filters is run out onto the ground and allowed to dry. Its volume is small after the water has evaporated but, if it accumulates to the point at which it constitutes a nuisance, it may be burned as it almost always carries enough oil to support combustion.

The filtered water produced by the plant above described (which does not include a settling tank) has the following average analysis:

TABLE 2

*Analysis of treated water*

| | | |
|---|---|---|
| Petroleum _____Parts per million__ | 0 to | 2 |
| Other suspensoids_____do____ | 5 to | 10 |
| Hydroxide _____do____ | | 0 |
| Carbonate _____do____ | | 0 |
| Bicarbonate _____do____ | 1000 to | 1300 |
| Chlorine _____do____ | 6000 to | 9000 |
| Calcium _____do____ | 100 to | 200 |
| Sulfate _____do____ | 40 to | 70 |
| Hydrogen sulfide (dissolved)__do____ | 4 to | 10 |
| Hydrogen ion concentration__pH__ | 7.4 to | 9.0 |
| Turbidity (Jackson candle) _____ | 10 to | 25 |

It will be understood that the dosages of chemicals above described are illustrative only and not limiting, though they do indicate figures which will give good results. Moderate variations in the salinity of the water do not as a rule require compensation, but a large increase in the quantity of petroleum and other suspensoids may call for materially increased dosages. As a rule the ratio of 3 silica to 15 aluminum sulfate (12 mols water) will hold good, but may require minor variations.

In varying the aging period by control over the alkalinity of the adjusted silicate solution, the feasibility of the operation must be kept in mind. At alkalinities below 700 parts per million ($Na_2O$) the aging period becomes so short that it is very difficult to catch the critical point for dilution, with the result that the solution may be underaged and relatively ineffective or it may gelatinize and be entirely lost. On the other hand, at alkalinities above about 1500 parts per million the aging period becomes so long that the preparation of the silicate solution becomes unduly tedious. Thus I prefer to work within the limits 700 to 800 parts per million, and on no account to allow the alkalinity to run above 1500 parts per million, all as calculated to sodium oxide.

The effectiveness of the above treatment in eliminating petroleum and other suspensoids from these saline waters is evident on comparison of the two analyses. The petroleum content is reduced to not exceed 2 parts per million, a content which will pass any regulating agency, while the other suspensoids are reduced to so small a figure that the water is visually clear. While the salt content is not appreciably changed and the water is still useless for most industrial purposes, it will be found entirely harmless when introduced in any moderate proportion into fresh water streams, or in any proportion when wasted to a sea or ocean. The increase in hydrogen sulfide content is due, not to the treatment but to the development of certain anaerobic bacteria during the time required for the treatment, and may be corrected by the method described in the copending application above referred to.

I claim as my invention:

1. A method of substantially removing emulsified and adsorbed petroleum particles from saline oil-field waters which comprises: treating the water with a minute quantity of an aqueous solution of sodium silicate previously reduced to an alkalinity within the range from 700 parts to 1500 parts per million calculated as sodium oxide and aged to a point just short of gelation; adding to the treated water a flocculating agent selected from the group consisting of the water-soluble salts of iron and aluminum, whereby a flocculent precipitate entraining said petroleum is formed, and separating said precipitate from the resultant, substantially petroleum-free water.

2. The method of resolving an intimate and substantially stable dispersion of petroleum in saline water which comprises: bringing a dilute solution of sodium silicate to an alkalinity expressed as sodium oxide within the range from 700 to 800 parts per million; aging the silicate solution to a point just short of gelation; preventing gelation of the aged solution by further dilution with water; treating the dispersion to be resolved with a minute proportion of said aged and diluted silicate solution, and further adding to said treated dispersion a water-soluble salt of a metal selected from the group consisting of iron and aluminum, whereby a flocculent precipitate entraining said petroleum is formed and said dispersion is resolved.

3. The method of preparing a treating solution for use with a flocculating agent to resolve intimate dispersions of petroleum in water which comprises: preparing a solution of sodium silicate containing about 0.5% by weight of sodium oxide and about 1.6% by weight of silicon dioxide; reducing the alkalinity of said solution to not less than 700 parts nor more than 800 parts per million (as sodium oxide) by the addition of acid thereto; aging said solution to a point just short of gelation, and preventing gelation of said aged solution by further dilution with not less than one volume of water.

4. The method of preparing a treating solution for use with a flocculating agent in resolving intimate dispersions of petroleum in water which comprises: preparing a solution of sodium silicate containing about 0.5% by weight of sodium oxide and about 1.6% by weight of silicon dioxide; reducing the alkalinity of said solution to not less than 700 parts nor more than 800 parts per million (as sodium oxide) by the addition of acid thereto; aging said solution to a point just short of gelation as indicated by the gelation of a sample of said solution to which a minor proportion of an acid has been added, and preventing gelation of said solution by further dilution with water immediately following the gelation of said sample.

RICHARD D. POMEROY.